STORAGE DEVICE

Filed April 2, 1958 2 Sheets-Sheet 1

Inventors
BEN ALEXANDER
JOHN F. SULLIVAN
By [signature]
Attorney

STORAGE DEVICE

Filed April 2, 1958

Inventors
BEN ALEXANDER
JOHN F. SULLIVAN
By [signature]
Attorney

United States Patent Office 3,104,377
Patented Sept. 17, 1963

3,104,377
STORAGE DEVICE

Ben Alexander, Nutley, and John F. Sullivan, Bloomfield, N.J., assignors to International Telephone and Telegraph Corporation, Nutley, N.J., a corporation of Maryland Filed Apr. 2, 1958, Ser. No. 725,950
6 Claims. (Cl. 340—173.2)

This invention relates to electrical storage devices and more particularly to a ferroelectric cell storage device and its circuits.

Ferroelectric cells for information storage have been heretofore described. Essentially these cells consist of a slab of ferroelectric material, such as barium titanate, and a pair of electrodes on opposite sides of the slab to form a condenser. The ferroelectric material when subjected to a polarizing voltage exhibits a hysteresis loop characteristic between the electrostatic polarizing force and the polarization of the material, of the same general type as the B-H hysteresis loop characteristic of ferromagnetic material. The operation of such a condenser for storage purposes consists of applying a voltage across the cell which drives it from one of the stable polarization levels on its hysteresis curve to the other. Upon removal of the voltage, the ferroelectric material remains at the latter level. Readout is accomplished by applying a reverse voltage across the cell of necessary amplitude. The construction of a two-dimensional memory array with ferroelectric material as known in the art consists of depositing a set of parallel metallic strips on one surface of a thin (.005–.01″) crystal and another set of strips at right angles on the opposite surface. The intersections of the strips form memory cells. An individual cell may be selected by applying to a strip on one surface a voltage pulse of slightly less than that required to switch any of the cells, and to a strip on the other surface a voltage pulse of opposite polarity but equal amplitude. In this manner a binary 1 is written in only at the cell that has the double voltage across it. At the end of the pulse, only that cell where the two strips cross is in the excited polarization state (representing a stored binary 1); the other cells on the two strips remain in the unexcited state. Operation in this manner imposes on the cells in the array the following requirement: Each cell must exhibit a hysteresis curve which is sufficiently like its members so that the voltage at which the polarization starts to change in the most sensitive cell is greater than one half the voltage at which the least sensitive cell has completed its polarization change. In a practical case greater uniformity is desirable.

The number of drivers required for storing N bits of information in a two-dimensional array such as described is $2\sqrt{N}$; that is, one driver for each conducting strip. For a one-million bit storage some two thousand drivers would be required.

It is evident that for a large number of storage bits a two-dimensional array becomes quite large and the driver components and circuitry required become excessive as well as complex and costly.

It is therefore an object of this invention to provide a storage array which will be more compact and require a greatly reduced number of drivers to operate the array.

In accordance with one feature of the present invention, we provide a three-dimensional ferroelectric storage cell array. A three-dimensional array including 1,000,000 cells would require only $3\sqrt[3]{1,000,000}$ or three hundred drivers. This array may consist of a number of two-dimensional arrays, one arranged behind the next. In accordance with a further feature of the present invention a storage of a binary 1 in a selective cell of such an array may be accomplished as follows. One driver applies a voltage somewhat less than that required to store a binary 1 to a corresponding one of the strips at right angles to the first step of each two-dimensional array. A third driver then applies an inhibiting voltage to all the cells of each of the two-dimensional arrays but one array.

For many purposes, it is desirable to provide storage cells which have, in addition to the two usual electrodes, one or more extra electrodes which may be used to provide further control over the polarization of the cell, particularly where individual storage cells are part of a multi-dimensioned array. For example, a three-dimensional storage array obviously requires cells each of which must have control voltages applied in three different dimensions.

It is therefore a further object to provide a ferroelectric storage cell having at least three electrodes, as for example, for use in a three-dimensional storage array.

Still another feature is a ferroelectric cell storage array comprising a slab of ferroelectric material and a plurality of cells incorporating the ferroelectric material as dielectric therefor, each of the cells having at least three electrodes as described above. Means are provided to apply a first voltage of half the given magnitude and polarity to each first electrode, a second voltage of half the given magnitude and opposite polarity to each said second electrode to produce a potential drop across each cell of the given magnitude and thereby cause a change in the polarization of the ferroelectric material of each cell when the two voltages are simultaneously applied. Where however despite the presence of the first and second voltages it is desired to inhibit this change of polarization of the cell, this is accomplished by applying a third voltage to each said third electrodes of the reverse polarity which will produce a potential drop across the cell of less than the given magnitude.

The above mentioned and other features and objects of this invention will become more apparent by reference to the following description taken in conjunction with the accompanying drawings, in which.

Figure 1:
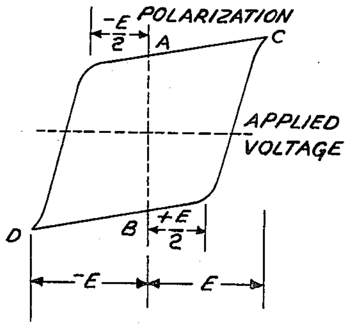
FIG. 1 is a typical hysteresis loop of ferroelectric material.

Referring now to FIG. 1 showing a typical hysteresis loop, the ordinates are P, the polarization of the crystal, and the abscissas are E, the applied voltage which is equal to the electric field strength multiplied by the crystal thickness. The capacitance of the crystal which is the ratio of the change in polarization to the change in applied voltage is small in the loop portions A—C and D—B and large in the loop sections A—D and B—C. In the positive state of polarization, A, which we can consider the normal state of polarization, a binary "0" is stored. If a positive read-out pulse of magnitude E is applied, the loop is traversed from A to C, the positive saturation point, and then back to A when the pulse is removed. Since the capacitance of the loop in this path is small and the fixed capacitor of the output circuit is made relatively large, the output voltage will be low under this condition. When a binary "1" is stored in the crystal material by applying a negative pulse of magnitude −E, the loop is traversed from A to D, the negative saturation point, and then to B, leaving the material in state B upon removal of the pulse. If a positive readout pulse E is then applied, the material will change from state B to C and then back to A upon removal of the pulse. In this case the capacitance of the loop section traversed is large, and therefore, the magnitude of the output voltage will be larger than in the readout from A to C. The applied voltage E is selected in conjunction with the characteristics of the crystal so that $\pm E/2$ will always fall before the knee of the hysteresis loop is reached to prevent any undesired excursion of the polarization of the cell with the application of the voltage $\pm E/2$.

Figure 2:
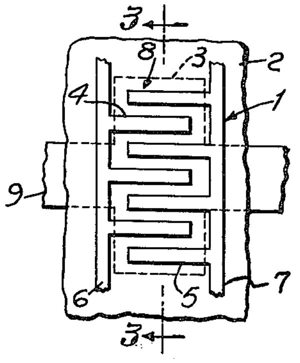
FIG. 2 is a plan view of the cell of this invention.
Figure 3:
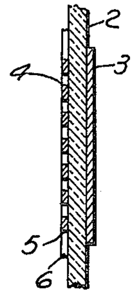
FIG. 3 is a cross-sectional view along line 3—3 of FIG. 2.

The ferroelectric cell 1 of this invention as shown in FIGS. 2 and 3 comprises a layer of ferroelectric material 2 on one side of which is placed an electrode 3 and on the opposite side is disposed a second electrode 4 and a third electrode 5. Electrodes 4 and 5 consist of a plurality of strip-like conductors which are respectively coupled to the leads 6 and 7 and are disposed in overlying relation to the electrode 3 in interlaced manner to form a grating, a grid-like structure 8. The interlaced strip conductors are made as narrow as possible, consistent with manufacturing processes, to effect the optimum electric field interaction between the fields produced by electrodes 4 and 5. The cell material 2 and the electrode 3 are made as wide as possible to cover the grid formed by electrodes 4 and 5 so that the electric field of the cell will have no losses. Coupled to the electrode 3 is lead 9. The electrodes can be deposited on the surface of the cell material 2 by means of printing, etching, or any other suitable means. The lead 9 can be considered as having applied thereto voltages in the X plane, Y plane voltages are applied to lead 6 and Z plane voltages to lead 7, so that there is constituted a three-dimensional cell in contrast to the two-dimensional cell of the prior art as heretofore described.

Figures 4, 5, 8:
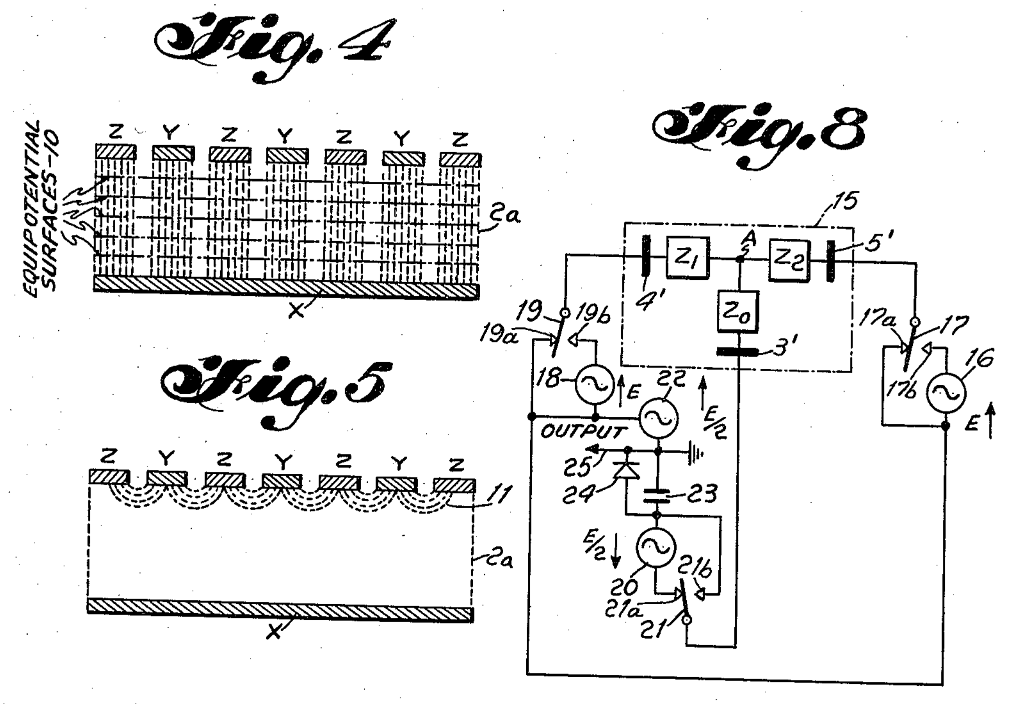
FIG. 4 is a view showing the electric field across one embodiment of the cell with one set of voltages applied to the electrode.
FIG. 5 is a view similar to FIG. 4 with another set of voltages.
FIG. 8 is an equivalent circuit diagram of the cell with voltage sources.
Figure 6:
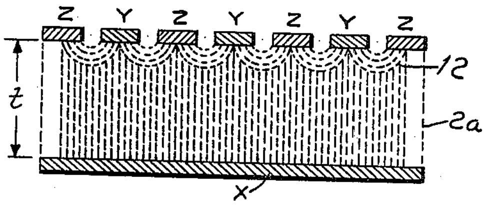
FIG. 6 is a view similar to FIG. 4 with still another set of voltages.

FIGS. 4 to 6, inclusive, illustrate the different electric fields that exist in the cell with different voltages applied to the three electrodes. In FIG. 4 the voltages on Z and Y electrodes are both of the same polarity and the same magnitude $\pm E/2$; on the X electrode a voltage of opposite polarity and the same magnitude is applied $\pm E/2$. The voltage across the cell is therefore equal to E and is sufficient for read-out or write-in purposes. The electric field as in any condenser lies between the opposing electrodes, X on the one side, and Z and Y on the opposite side with Z and Y being of the same polarity and X being of the opposite polarity. The equipotential surfaces 10 are therefore parallel to the surfaces of the crystal at any depth in the crystal. If the voltages on Z and Y are of the same polarity and the same magnitude $\pm E/2$ and no voltage is applied to the X electrode, then the field distribution remains the same and the voltage across the cell will be $\pm E/2$ and therefore insufficient to change the polarization state of the cell. That is to say the potential drop across the cell will be $\pm E/2$ as the case may be. In FIG. 5 the voltages applied to Z and Y are of opposite polarity and the magnitude $\pm E/2$ while the voltage on the X electrode is zero. Therefore, the field configuration will show electric lines of force from the Z electrodes to the Y electrodes curving through the dielectric material of the cell and no field existing through the cell from the Y and Z electrodes to the X electrodes. The condenser relation exists only between the Y and Z electrodes, and no condenser relation exists between the Y or Z electrodes and the X electrodes. The equipotential surface of the electric field in the cell will therefore lie orthogonal to the scalloped configuration 11 and the voltage across the cell is zero. In FIG. 6 the voltages on Z and Y are of opposite polarity $\pm E/2$, and the voltages applied to the X electrode are equal to $\pm E/2$. Here again, the electric field exists between the Y and Z electrodes of the scalloped nature shown in FIG. 5 and the electric field extends within the cell from the surface 12 to the X electrode and the voltage across the cell is equal to $\pm E/2$ according to the polarity of the voltage applied to the X electrode. In effect, the voltages on the Y and Z electrodes cancel each other, so that the potential drop across the cell is equal to the voltage applied to the X electrode.

Figure 7:
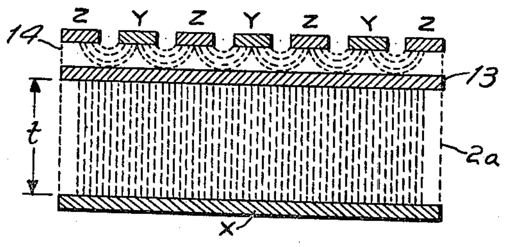
FIG. 7 is a view of a second embodiment of this invention showing the electric field in the cell with the same applied voltages as in FIG. 6.

FIG. 7 shows a second embodiment of this invention wherein a conductive plate 13 is placed on the opposite side of the cell from the X electrode and dielectric material 14 (non ferroelectric) is disposed between the plate 13 and the Y and Z electrodes. The effect of this plate is to establish within the cell an equipotential surface which is parallel to both the X, Y and Z electrodes. The advantage of this plate is that it allows the applied voltage to be the same at any point throughout the cell since, as we have mentioned before, the applied voltage is equivalent to the electric field strength multiplied by the thickness, $t$, of the cell. Therefore, instead of the varying applied voltage along the cell determined by the variable height of the scalloped equipotential surface 12, there is a constant applied voltage throughout the entire cell. This is advantageous for the correct and precise switching operations required in the operation of the ferroelectric cell.

In FIG. 8, the equivalent circuit of the cell 1, the dotted line 15 encloses the equivalent portions of the cell 1 with the X electrode 3′, the Y electrode 4′ and the Z electrode 5′. $Z_1$ and $Z_2$ represent the capacitive coupling between the Y and Z electrodes which produces an equipotential surface in the cell at point A. $Z_0$ represents the capacitance of the ferroelectric material interposed between the electrodes 3′, 4′, and 5′. $Z_1$ and $Z_2$ have to be small with respect to $Z_0$ so that when the full voltage is applied across the cell, the drop across $Z_1$ and $Z_2$ will be minimized. Voltage generator 16 of magnitude E through a S.P.D.T. switch 17 is coupled to the electrode 5′. Generator 18 of magnitude E, through S.P.D.T. switch 19 is coupled to the Y electrode 4′. Generator 20 of magnitude $E/2$ through S.P.D.T. switch 21 is coupled to the X electrode 3′. A generator 22 of magnitude $E/2$ couples generator 18 to capacitor 23, and capacitor 23 is coupled to generator 20. A rectifier 24 is coupled across the capacitor 23 and to the output lead 25. The other side of capacitor 23 is coupled to ground. The combination of generator 16 and switch 17 may be a multivibrator or a pulse generator and is shown in a simplified form wherein to better illustrate the theory underlying this invention. The same of course is true for the combination of generator 18 with switch 19 and generator 20 with switch 21. It is to be understood that the generators can deliver either positive or negative pulses as may be desired. In the operation of the circuit, if the cell is at point A (0 stored) or at point B (1 stored), and we want to read out either a 0 or a 1 as the case may be, it is necessary to apply a voltage across the cell of +E. This can be accomplished by applying to the X electrode 3′ a voltage $+E/2$ and to the Y and Z electrodes 4′ and 5′ $-E/2$ so that the voltage across the cell will be +E. The switches 17, 19 and 21 are then thrown to the appropriate positions 17*a*, 19*a* and 21*a* as shown in FIG. 8, to supply these voltages to the respective electrodes. For write-in, or to go from state A to state B, the opposite voltages on each of these electrodes are used to obtain a voltage across the cell of −E. If no readout of 0 or 1 is desired and no write-in is required, then it is necessary to switch the voltages supplied to the X, Y, and Z electrodes so that the voltage across the cell will be either zero or $+E/2$, so that there will be no change in the polarization of the cell. The following table shows the different combinations of voltages that can be applied to the electrodes of the cell when write-in, readout, no write-in or no readout is desired:

| | Switch Positions | | | Generator Output and Polarity | | | | "X" Volt. | "Y" Volt. | "Z" Volt. | Voltage Across Cell |
|---|---|---|---|---|---|---|---|---|---|---|---|
| | 17 | 19 | 21 | 16 | 18 | 20 | 22 | | | | |
| Write-In Binary 1 | *a* | *a* | *a* | 0 | 0 | − | + | −E/2 | +E/2 | +E/2 | −E |
| Readout Binary 1 or Binary 0. | *a* | *a* | *a* | 0 | 0 | + | − | +E/2 | −E/2 | −E/2 | E |
| No Readout and No Write-In. | *a* | *a* | *b* | 0 | 0 | 0 | + | 0 | +E/2 | +E/2 | 0 |
| | *b* | *a* | *b* | − | 0 | 0 | + | 0 | +E/2 | −E/2 | 0 |
| | *b* | *a* | *b* | + | 0 | 0 | − | 0 | −E/2 | +E/2 | 0 |
| | *a* | *a* | *b* | 0 | 0 | 0 | − | 0 | −E/2 | −E/2 | +E/2 |
| | *a* | *a* | *a* | 0 | 0 | + | + | +E/2 | +E/2 | +E/2 | 0 |
| | *b* | *a* | *a* | − | 0 | + | + | +E/2 | +E/2 | −E/2 | +E/2 |
| | *b* | *a* | *a* | + | 0 | + | − | +E/2 | −E/2 | +E/2 | +E/2 |
| | *b* | *a* | *a* | − | 0 | − | + | −E/2 | +E/2 | −E/2 | −E/2 |
| | *a* | *b* | *a* | 0 | − | − | + | −E/2 | −E/2 | +E/2 | −E/2 |
| | *b* | *b* | *a* | − | − | − | + | −E/2 | −E/2 | −E/2 | 0 |

The output of the circuit is taken across capacitor 23 and rectifier 24.

Figure 9:
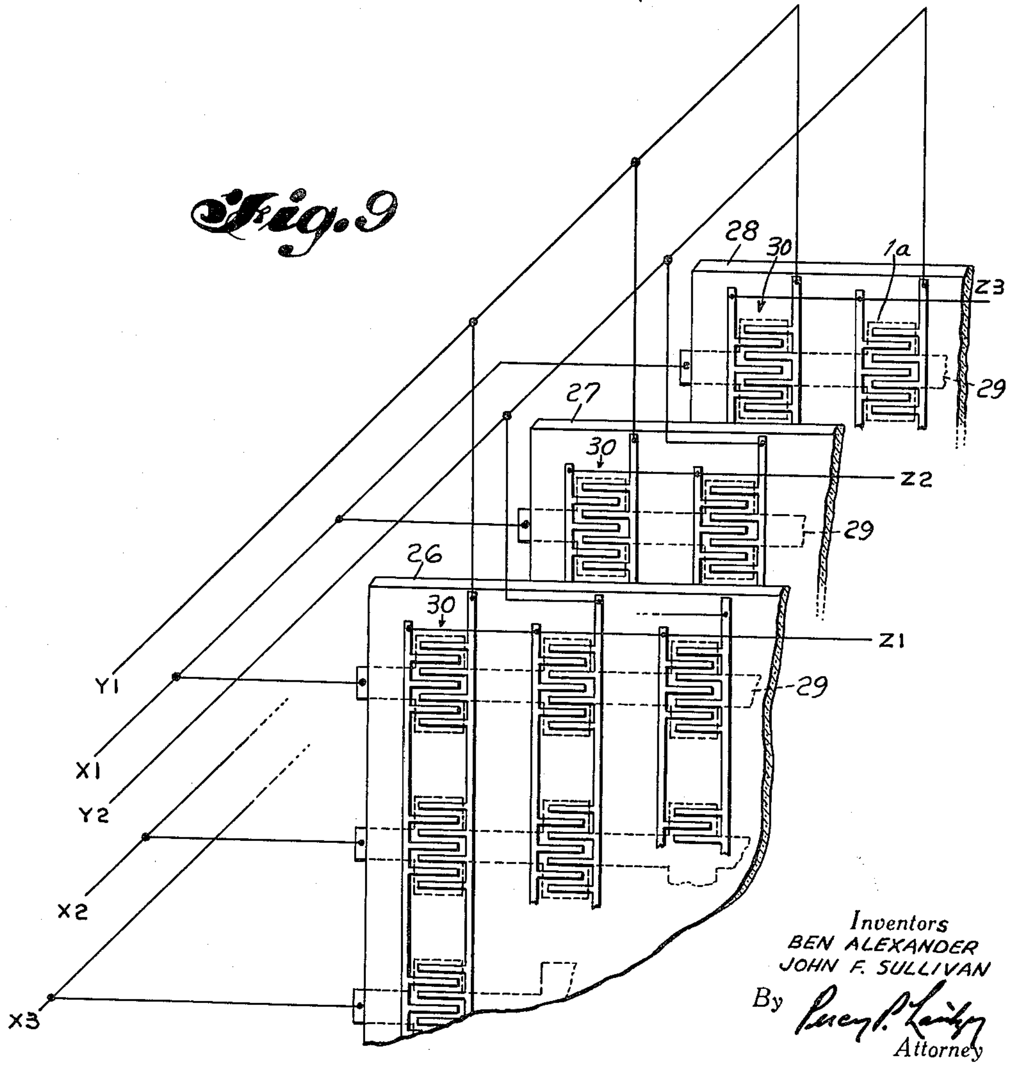
FIG. 9 is a view of the three-dimensional storage cell array of this invention.

The three-dimensional array of FIG. 9 shows slabs 26, 27, and 28 of ferroelectric material disposed in spaced relation. The three-dimensional cell 1*a* incorporates the ferroelectric material as a dielectric, and the X, Y, and Z electrodes are printed on the opposite surfaces of the material, with the X electrode on one side and the Y and Z electrodes in the interlaced grid fashion above described on the opposite side. Each of the slabs 26, 27, and 28 contain a plurality of cells 1*a* disposed in discrete rows extending lengthwise and crosswise of each of the slabs, each of the lengthwise rows 29 being substantially parallel to the other lengthwise rows, and each of the crosswise rows 30 being substantially parallel to the other crosswise rows. The lengthwise and crosswise rows are disposed substantially perpendicular to each other, and each intersection of the lengthwise and crosswise rows determines the position of each of the cells 1*a*. The X electrodes of each of the cells lying in each of the lengthwise rows 29 are coupled together; the Y electrodes of each of the cells disposed in each of the crosswise rows are coupled together and the Z electrodes of all of the cells are similarly coupled together. By an extension of the same procedure, the X electrodes of corresponding lengthwise rows of each of the slabs 26, 27, and 28 are coupled together; the Y electrodes of each of the corresponding crosswise rows of the slabs are coupled together and in the same manner the Z electrodes of all the cells of each slab are coupled together. When it is desired to read out or write-in information in any cells of a slab, pulses of the correct voltage are transmitted through the appropriate coordinate leads to the selected cell, in accordance with the procedure heretofore described. It is to be understood that although three slabs have been used in the description for illustration, any number may be used, and the size thereof may be varied according to the needs of the equipment.

While we have shown a three-dimensional ferroelectric storage cell with three electrodes, it is to be understood that more than three electrodes can be used in such a cell by following the theory and construction of the three-dimensional cell described above.

While we have described above the principles of our invention in connection with the specific apparatus, it is to be clearly understood that this description is made only by way of example and not as a limitation to the scope of our invention as set forth in the objects thereof and in the accompanying claims.

We claim:

1. A storage cell comprising ferroelectric material, a pair of electrodes disposed on opposite faces of said material to provide an electric field therebetween passing through said material, and at least one additional electrode having portions thereof interlaced with portions of one of said pair to modify said field, the other electrode of said pair covering a surface area on said material corresponding to an area on the opposite face adjacent to and encompassing a plurality of said interlaced electrode portions.

2. A storage cell comprising ferroelectric material, an electrode positioned on one face of said material, a second electrode positioned adjacent an opposite face of said material and a third electrode positioned adjacent said opposite face and having portions thereof interlaced with portions of said second electrode for controlling the potential applied by said first and second electrodes to said ferroelectric material, said first electrode covering an area on said one face of said material corresponding to an area on said opposite face of said material adjacent to and encompassing a plurality of said interlaced portions of said second and third electrodes.

3. A storage cell comprising ferroelectric material, a pair of electrodes having interlaced projections disposed adjacent said material, and a third electrode disposed adjacent said material on a side thereof opposite that adjacent said interlaced projections of said pair of electrodes, said third electrode covering an area on said opposite side corresponding to an area adjacent to and encompassing a plurality of said interlaced projections of said pair of electrodes.

4. A storage cell comprising a ferroelectric material, a pair of electrodes forming a capacitor with said ferroelectric material disposed therebetween as a dielectric, and a third electrode having projections thereon interlaced with projections of one of said pair of electrodes and capacitively coupled thereto through said material, the other electrode of said pair covering a surface area on said material corresponding to a surface area adjacent to an encompassing a plurality of said interlaced projections of said third electrode and said one of said pair of electrodes.

5. A storage cell comprising a layer of ferroelectric material, a layer of conductive material, a first electrode, means disposing said ferroelectric material between said first electrode and said conductive material, a second electrode, a third electrode a layer of dielectric material, and means disposing said second and third electrodes on said dielectric material in overlying relation to said conductive material and said first electrode.

6. A storage cell comprising a layer of ferroelectric material, a first electrode disposed on one side of said material, a second electrode disposed opposite said first electrode on the other side of said layer, said second electrode consisting of a plurality of projecting members in parallel spaced relation, a third electrode consisting of a plurality of projecting members, said projecting members of said third electrode extending adjacent said members of said second electrode on the same side of said layer with said plurality of members of said second electrode being disposed in interlaced spaced relation with said plurality of members of said third electrode and said first electrode being in underlying relation to said second and third electrodes.

References Cited in the file of this patent

UNITED STATES PATENTS

| | | |
|---|---|---|
| Re. 23,813 | Adler | Apr. 20, 1954 |
| 1,943,715 | Bailey | Jan. 16, 1934 |
| 2,156,099 | Scheppmann | Apr. 25, 1939 |
| 2,695,398 | Anderson | Nov. 23, 1954 |
| 2,734,184 | Rajchman | Feb. 7, 1956 |
| 2,736,880 | Forrester | Feb. 28, 1956 |
| 2,839,738 | Wolfe | June 17, 1958 |
| 2,839,739 | Anderson | June 17, 1958 |
| 2,859,428 | Young | Nov. 4, 1958 |
| 2,884,617 | Pulvari | Apr. 28, 1959 |
| 2,905,928 | Anderson | Sept. 22, 1959 |
| 2,933,618 | Buck | Apr. 19, 1960 |
| 2,956,265 | Schwenzeger | Oct. 11, 1960 |
| 2,972,734 | Anderson | Feb. 21, 1961 |

FOREIGN PATENTS

| | | |
|---|---|---|
| 769,384 | Great Britain | Mar. 6, 1957 |